(12) United States Patent
Hars

(10) Patent No.: US 8,635,260 B2
(45) Date of Patent: Jan. 21, 2014

(54) RANDOM NUMBER GENERATOR INCORPORATING CHANNEL FILTER COEFFICIENTS

(75) Inventor: Laszlo Hars, Lafayette, CO (US)

(73) Assignee: Seagate Technology LLC, Cupertino, CA (US)

( * ) Notice: Subject to any disclaimer, the term of this patent is extended or adjusted under 35 U.S.C. 154(b) by 1084 days.

(21) Appl. No.: 12/629,256

(22) Filed: Dec. 2, 2009

(65) Prior Publication Data

US 2011/0131264 A1 Jun. 2, 2011

(51) Int. Cl.
G06F 7/58 (2006.01)

(52) U.S. Cl.
USPC ........................................................ 708/254

(58) Field of Classification Search
USPC ........................................................ 708/254
See application file for complete search history.

(56) References Cited

U.S. PATENT DOCUMENTS

| | | | |
|---|---|---|---|
| 4,122,405 A | 10/1978 | Tietz et al. | |
| 4,270,430 A * | 6/1981 | Deutsch | 84/608 |
| 4,641,102 A | 2/1987 | Coulthart et al. | |
| 4,791,594 A * | 12/1988 | Harney et al. | 708/254 |
| 4,799,259 A | 1/1989 | Ogrodski | |
| 5,471,176 A | 11/1995 | Henson et al. | |
| 5,541,996 A * | 7/1996 | Ridenour | 380/46 |
| 5,732,138 A * | 3/1998 | Noll et al. | 380/28 |
| 6,675,113 B2 | 1/2004 | Hars | |
| 6,931,425 B2 | 8/2005 | Xie et al. | |
| 6,947,960 B2 | 9/2005 | Hars | |
| 6,993,543 B2 | 1/2006 | Hars | |
| 7,031,991 B2 | 4/2006 | Hars | |
| 7,047,262 B2 | 5/2006 | Hars | |
| 7,124,155 B2 | 10/2006 | Hars | |
| 7,149,764 B2 | 12/2006 | Henry et al. | |
| 2003/0156713 A1 | 8/2003 | Hars | |
| 2003/0158875 A1 | 8/2003 | Hars | |
| 2003/0158876 A1 | 8/2003 | Hars | |
| 2003/0172096 A1 * | 9/2003 | Xie et al. | 708/250 |
| 2003/0187890 A1 | 10/2003 | Hars | |
| 2003/0200238 A1 | 10/2003 | Hars | |
| 2006/0067527 A1 * | 3/2006 | Urivskiy et al. | 380/46 |
| 2007/0273408 A1 | 11/2007 | Golic | |
| 2008/0313249 A1 | 12/2008 | Fukushima et al. | |
| 2009/0077146 A1 | 3/2009 | Hars | |
| 2009/0077147 A1 | 3/2009 | Hars | |

(Continued)

OTHER PUBLICATIONS

"Cryptographically Secure Pseudorandom Number Generator", Wikipedia, 2009, <http://en.wikipedia.org/wiki/Cryptographically_secure_pseudorandom_number_generator>.

(Continued)

Primary Examiner — Tan V. Mai
(74) Attorney, Agent, or Firm — Cesari & Reed, LLP; Kirk A. Cesari; Christian W. Best

(57) ABSTRACT

Devices and methods are disclosed for improved random number generation. In some embodiments, a device may include a plurality of registers configured to store channel filter coefficients, each of the channel filter coefficients including a plurality of bits, and a controller configured to retrieve at least one channel filter coefficient from the plurality of registers, and to generate a random number based at least in part on the at least one retrieved channel filter coefficient. The device may generate a random number at least in part based on a number of least-significant bits of the at least one retrieved channel filter coefficient.

18 Claims, 3 Drawing Sheets

(56) References Cited

U.S. PATENT DOCUMENTS

| | | |
|---|---|---|
| 2009/0106339 A1 | 4/2009 | Vasyltsov et al. |
| 2009/0110188 A1 | 4/2009 | Dolgunov et al. |
| 2009/0132624 A1 | 5/2009 | Haselsteiner et al. |

OTHER PUBLICATIONS

Rick Walker: "A Monolithic High-Speed Voltage Controlled Ring Oscillator", Instrument Technology Department, HP Labs, Palo Alto, CA.

* cited by examiner

RANDOM NUMBER GENERATOR INCORPORATING CHANNEL FILTER COEFFICIENTS

BACKGROUND

The present disclosure is directed to encryption systems for devices. In particular, the present disclosure is directed to random number generators for generating seeds for pseudorandom number generators in devices, such as data storage devices.

There are many applications that require the fast production of random numbers having high levels of unpredictability. Such applications include cryptographic key generation in key servers, session keys, and nonces; simulations; Monte Carlo or randomized computations; dithering; gambling; video games; and the like. Often buffered, off-line generated random numbers may be used. However, the necessary large secure buffer is typically expensive and may introduce a significant latency for the buffer to be filled.

Another application of highly unpredictable random numbers is related to securing data storage devices. Common techniques for securing data storage devices include the use of cryptographic algorithms that rely on secret values, such as passwords or cryptographic keys. Such algorithms are typically open to the public and as such rely heavily on the secret quantity. Thus, the strength of the secret value is a function of how easy it is to guess the value. In general, the strongest secret quantity will be one that is selected through a true random process, such as random number generation. Accordingly, there is an ongoing need for techniques and systems for efficiently generating random numbers for securing data storage devices.

SUMMARY

A first aspect of the present disclosure is directed to a device that includes a plurality of registers configured to store channel filter coefficients. The device also includes a controller configured to retrieve the channel filter coefficient(s) from the plurality of registers and to implement a random number generator. The random number generator is configured to generate a random number based at least in part on the values of the retrieved channel filter coefficient(s).

Another aspect of the present disclosure is directed to a data storage device that includes a controller configured to retrieve channel filter coefficients from a plurality of registers of a data receiver. The data storage device also includes an algorithm implemented by the controller to generate a random number based at least in part on the values of the retrieved channel filter coefficients.

Another aspect of the present disclosure is directed to a method for encrypting a device. The method includes retrieving channel filter coefficients from a plurality of registers of the device, and generating at least one seed value based at least in part on the value of each of the retrieved channel filter coefficients. The method also includes performing a hashing algorithm on the at least one seed value, generating a random number based at least in part on the at least one hashed seed value, and outputting the random number.

DETAILED DESCRIPTION

The present disclosure is directed to cryptographic pseudorandom number generators for supplying devices, such as data storage devices, with random numbers based on coefficients of adaptive channel filters (referred to as channel filter coefficients). The channel filter coefficients are at least partially unpredictable physical entropy sources that may be used to seed cryptographic random number generators at each power up and at special requests (e.g., while re-initializing firmware).

The entropy obtained from the channel filter coefficients is desirably based on the full values of the channel filter coefficients rather than being based on comparisons to preset median values. As discussed below, each channel filter coefficient typically attains only a few distinct values, and a substantial portion of the variability in the given channel filter coefficient is preserved in the least significant bits. Seeding with such physical entropy sources allows a pseudorandom number generator to provide unique pseudorandom number sequences, with a negligible probability of a repeated sequence. Furthermore, with repeated access to the channel filter coefficients, the data storage device may obtain as much entropy as necessary for encryption purposes. Accordingly, generating secure random sequences in this manner precludes the need for secure, protected storage for keys or for the internal state of the generator between random number generating sessions, for example, over power cycles.

Figure 1:
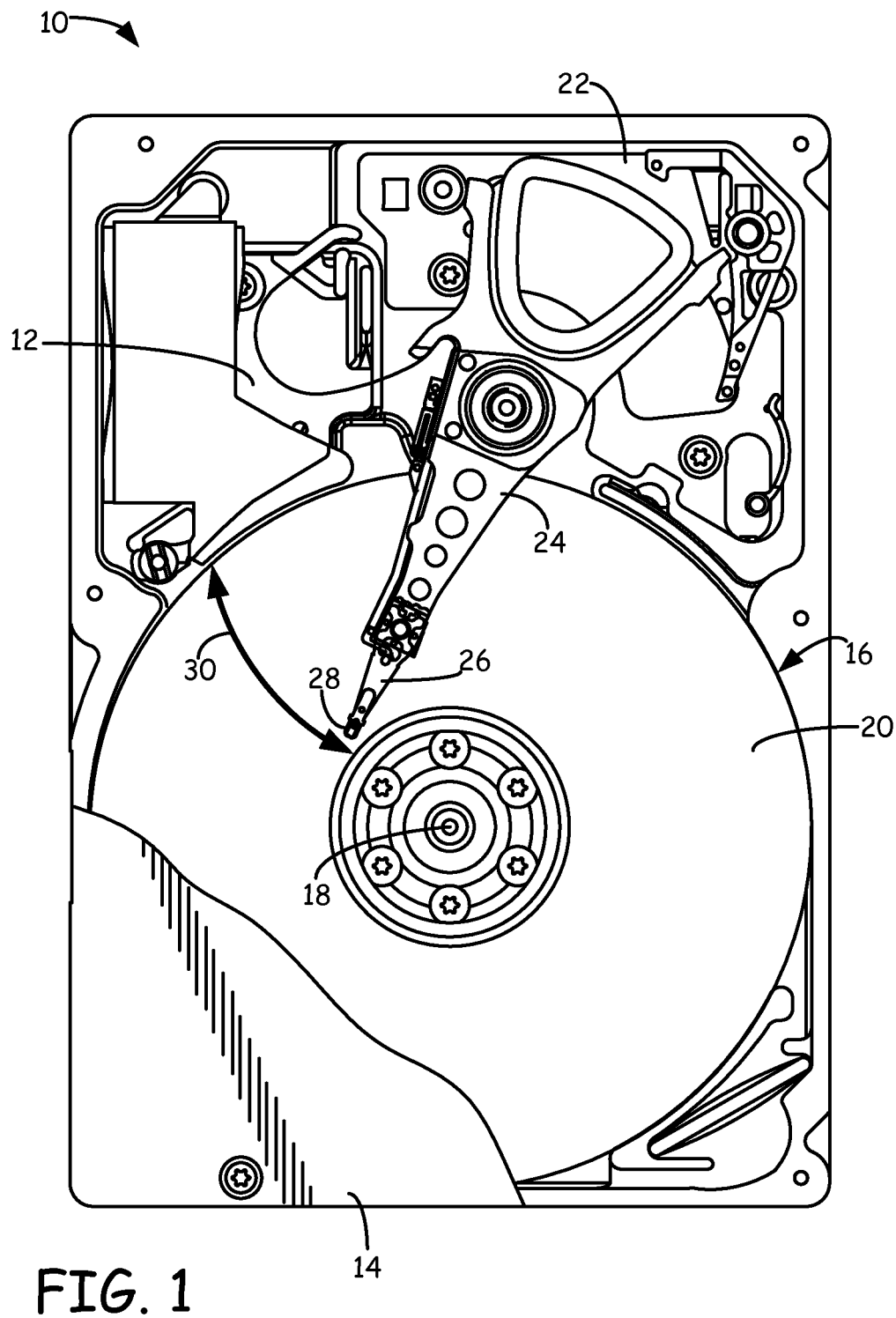
FIG. 1 is a plan view of a data storage device for storing and transferring data.

FIG. 1 is a plan view of storage device 10, which is an exemplary data storage device (e.g., a hard disk drive) for storing and transferring data with a host device (not shown). As shown, the components of storage device 10 are retained between base 12 and top cover 14 (shown in partial cut-away), which mate to form a partially or fully sealed housing. Storage device 10 also includes storage disk 16 and spindle motor 18, where spindle motor 18 rotates storage disk 16 in a rotational direction during operation. Storage disk 16 includes recordable surface 20, which is a surface of storage disk 16 having one or more recordable regions.

Storage device 10 further includes actuation motor 22 (e.g., a voice coil motor), actuator arm 24, suspension assembly 26, and slider 28, where slider 28 carries a transducing head (not shown in FIG. 1). Slider 28 is supported by suspension assembly 26, which in turn is supported by actuator arm 24. Actuation motor 22 is configured to pivot actuator arm 24 about an axis in order to sweep suspension assembly 26 and slider 28 in an arc across recordable surface 20 (represented by arrow 30), where slider 28 desirably floats above recordable surface 20 on a cushion or air. An additional microactuation system (not shown) may also be used to produce precise, small-scale movements of suspension assembly 26 and slider 28. As slider 28 moves across recordable surface 20, the transducing head carried by slider 28 may be positioned relative to selected data tracks located on recordable surface 20. This allows the transducing head to write data to, and read from, the data tracks on recordable surface 20 during operation. Accordingly, during a read operation, the transducing head generates a read signal based on the magnetic pattern stored in recordable surface 20. This read signal is processed by a data receiver (not shown in FIG. 1) to identify data represented by the magnetic pattern.

During operation, actuator arm 24 may be prone to mechanical vibrations, which are affected by air turbulence. The vibration in vertical direction may influence the amplitude of the read signal, while the radial vibration may affects the noise pattern from the granular structure of the magnetic particles and crosstalk from neighbor tracks. In order to keep the transducing head of slider 28 on track, servo patterns may be written to recordable surface 20. These servo patterns may be organized in radial spokes which are typically traversed by the transducing head about 200 times per revolution.

After the transducing head crosses these servo patterns, a controller (not shown in FIG. 1) evaluates the read signal and corrects the radial position accordingly. It also tunes an adaptive channel equalization filter for optimum signal shape. This may be accomplished with hard coded algorithms in the integrated circuits, or with drive firmware stored on a computer storage medium of storage device 10 (e.g., in read-only memory), which can access the channel filter coefficients, for example via a data bus or a diagnostic interface between the main control application-specific integrated circuit (ASIC) and the channel signal processor.

The tracking correction is based on the current radial position, velocity and acceleration of the transducing head. As discussed below, the channel filter coefficients represent resistor values of an analog equalization filter, continuously tuned by the controller of the read/write channel chip to make the peaks of the output signal close to equally high. These values are affected by the turbulent airflow and mechanical vibrations, as well as by the head noise, the electronic noise, the motor speed variations, the flight height of the transducing head, the actual path of the transducing head over the track, the tracking error corrections, and the like. Thus, the channel filter coefficient values are constantly updated as the transducing head reads the servo patterns on recordable surface 20 to maintain correct positioning over the track. These updated values provide unpredictable physical entropy sources that may be used to seed cryptographic random number generators, as well as faster but less unpredictable pseudorandom number generators.

Figure 2:
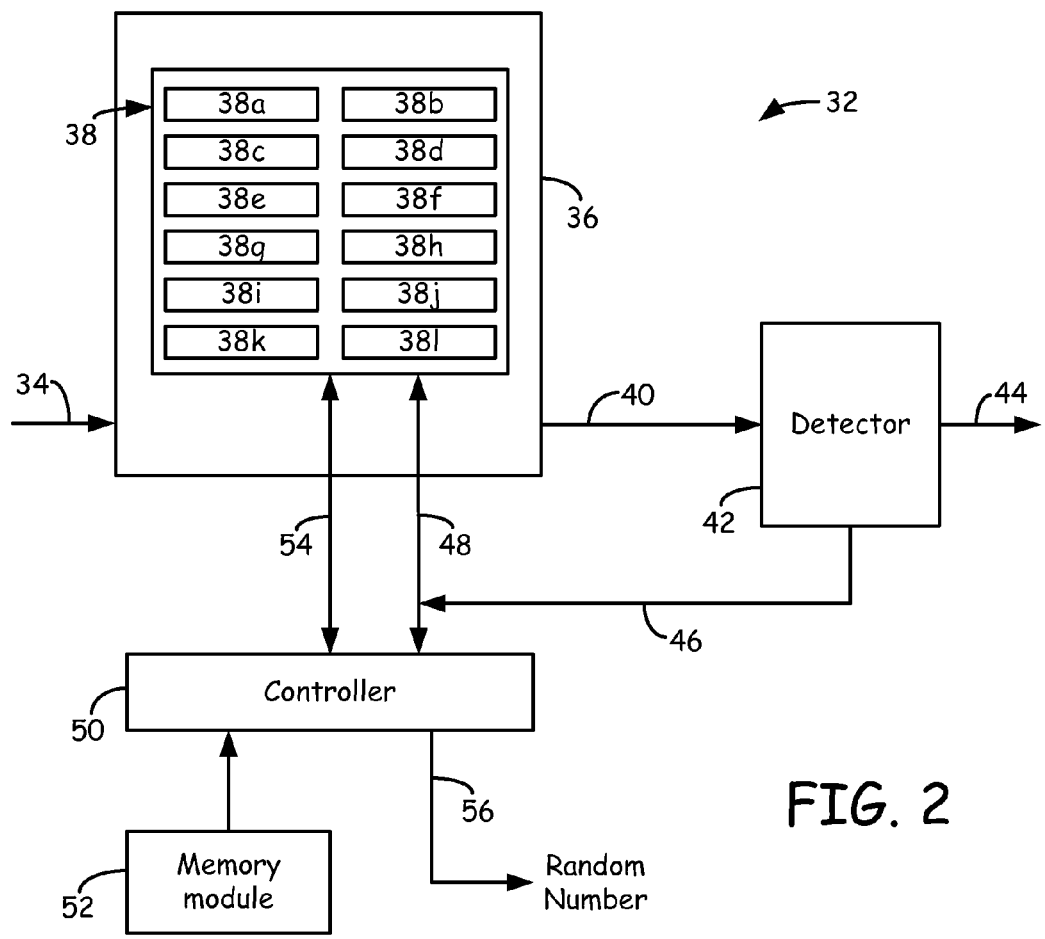
FIG. 2 is a block diagram of data receiver of the data storage device.

FIG. 2 is a block diagram of data receiver 32, which is an example of a suitable data receiver for use in storage device 10 (shown in FIG. 1). As shown in FIG. 2, data receiver 32 receives a read signal from the transducing head of slider 28 on communication line 34. Data receiver 32 may also include one or more preamplifiers (not shown) to amplify the read signal, and/or more signal filters (not shown) to remove noise from the read signal, and/or one or more analog-to-digital converters (not shown) to digitize the read signal. Communication line 34 is connected to equalization filter 36, which is configured to modify the read signal based on the channel filter coefficients stored in registers 38. Examples of suitable filters for equalization filter 36 include digital and analog equalization filters, such as finite impulse response filters.

In the shown embodiment, registers 38 include 12 separate registers 38a-38l, each of which stores a channel filter coefficient (e.g., 8-bit registers). In alternative embodiments, registers 38 may include different numbers of registers based on the particular designs of storage device 10. The channel filter coefficients stored in registers 38a-38l are used by data receiver 32 to modify the read signals to achieve an increased quality of the received read channel signal.

The equalized read signal that is output from equalization filter 36 is relayed over communication line 40 to detector 42. Detector 42 is a signal detector (e.g., a Viterbi detector), which receives and evaluates the equalized read signals from equalization filter 36. This allows detector 42 to identify whether equalization filter 36 is properly modifying the read signals. The equalized read signals are then output from detector 42 along communication line 44, where they may undergo post processing (e.g., parity error checking) to produce channel output signals.

As discussed above, the read signals relayed to equalization filter 36 have signal characteristics that vary due to factors such as turbulent airflow, mechanical vibrations, head noise, electronic noise, motor speed variations, flight height of the transducing head, the actual path of the transducing head over the track, the tracking error corrections, and the like. As such, equalization filter 36 frequently updates the channel filter coefficients stored in registers 38a-38l to achieve an increased quality of the received read channel signal. This may be performed with feedback lines 46 and 48, which connects registers 38, detector 42, and controller 50, thereby providing a process control loop that may be managed by controller 50.

As successive equalized read signals are relayed from equalization filter 36 to detector 42 over communication line 42, detector 42 evaluates the equalized read signals. If the signal quality is not optimal, detector 42 relays one or more correction signals to registers 38 over feedback lines 46 and 48. The channel filter coefficients stored in registers 38a-38l may then be updated to keep the signal characteristics of the equalized read signals the most desirable. As discussed above, because storage device 10 continuously reads the servo patterns on recordable surface 20 to keep the transducing head correctly positioned over the track, the channel filter coefficients stored in registers 38a-38l are constantly updated.

The channel filter coefficients are typically updated to remain around a set of values that represent the most likely values needed to properly modify the read signal. Thus, each channel filter coefficient typically attains only a few distinct values. Furthermore, one or more of the channel filter coefficients may be fixed as an asymmetry compensation tap, which is set for the transducing head and each zone on recordable surface 20 during the manufacture of storage device 10. In these cases, the fixed coefficients do not provide physical entropy and may be disregarded.

When a random number is requested (e.g., for seeding or reseeding a random number generator), a seek and read operation may be performed by the transducing head. The seek operation desirably results in a significant movement of actuator arm 24, and the read operation desirably reads at least a full track of data. This results in substantial changes in the channel filter coefficients, thereby reducing any potential correlations between consecutive acquired values of the same coefficients.

Based on firmware stored in memory module 52, controller 50 may retrieve the channel filter coefficients from registers 38 over communication line 54 for use in seeding a random number generator. In function, the random number generator may be an algorithm stored on a computer storage medium (e.g., memory module 52) and implemented by controller 50 to generate random numbers based on the channel filter coefficients. The resulting generated random numbers may be transmitted from controller 50 on output line 56 for a desired use.

As discussed above, each channel filter coefficient typically attains only a few distinct values, and a substantial portion of the variability in the given channel filter coefficient is preserved in the least significant bits. In an 8-bit register (e.g., registers 38a-38l), the least significant bits may include bits [1,2], [1,2,3], and/or [1,2,3,4]. The entropy obtained from the channel filter coefficients is desirably based on the actual values of the channel filter coefficients rather than being based on comparison to preset median values. While a comparison to a preset median value (e.g., greater or less than the preset median value) provides a suitable means for generating random numbers, most of the available physical entropy in the channel filter coefficients (i.e., the least significant several bits) is discarded by only retaining the results of the comparisons. Furthermore, any preset median values are also subject to drift due to environmental changes, thereby potentially inducing bias and thus further entropy loss in the output sequence.

The random number is desirably generated based at least in part on the two least-significant bits (i.e., bits [1,2]) of at least one of the channel filter coefficients, more desirably on the four least-significant bits (i.e., bits [1,2,3,4]), and even more desirably on the full number of bits (e.g., 8 bits). In the exemplary implementation, the full 8-bits of each channel filter coefficient generally includes about three bits of Shannon Entropy H, which is represented by Equation 1:

$$H = -\Sigma p_i(y_i)\log_2 p_i(y_i)$$ (Equation 1)

where $p_i(y_i)$ is the probability mass function of $y_i$ and where $y_i$ is a discrete random variable with possible distinct values $y_1 \ldots y_n$. In one example implementation, the exceptions to this generalization include coefficient 1 (about 1.5 bit), coefficient 2 (about 3.5 bits), coefficient 4 (about 2.4 bits), and coefficient 11 (zero bits, fixed as an asymmetry compensation tap). If all of the channel filter coefficients were fully independent, the overall entropy of the 12 channel filter coefficient bytes would be about 32 bits, as shown below in Table 1.

TABLE 1

| Channel Filter | Entropy (bits) |
|---|---|
| 1 | 1.491 |
| 2 | 3.536 |
| 3 | 3.266 |
| 4 | 2.378 |
| 5 | 3.082 |
| 6 | 3.104 |
| 7 | 3.018 |
| 8 | 2.765 |
| 9 | 2.967 |
| 10 | 3.268 |
| 11 | 0.000 |
| 12 | 3.144 |
| Total | 32.019 |

However, statistical tests show that the actual amount of Shannon entropy attainable in an exemplary 12-register system is less than 32 bits (e.g., from about 16 bits to about 24 bits) because of correlations between the channel filter coefficients.

Figure 3:
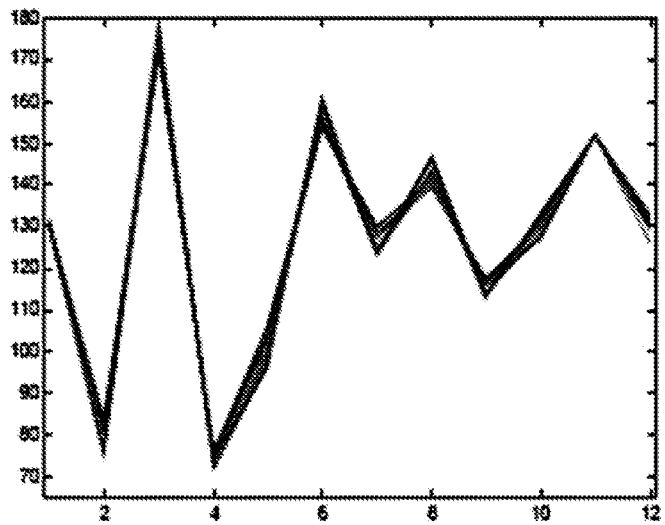
FIG. 3 is a graphical illustration of channel filter coefficients versus values of the channel filter coefficients attainable from the data receiver of the data storage device, which illustrates correlations that may occur between separate channel filter coefficients.

FIG. 3 is a graphical illustration of channel filter coefficients 1-12 (x-axis) versus the values of the coefficients for 10 sample coefficient sets (y-axis), which illustrates correlations that may occur between the separate channel filter coefficients. The data points belonging to a particular coefficient set are connected by straight line segments. As shown in FIG. 3, several segments between the coefficient values (e.g., between coefficients 4 and 5) are substantially parallel, which illustrates a positive correlation. Thus, if coefficient 4 increases, coefficient 5 will also increase, and the combined entropy of coefficients 4 and 5 is not much greater than the entropy of coefficient 4 alone. Furthermore, some segments (e.g., between coefficients 7 and 8) cross each other at substantially the same half-way point, which illustrates a negative correlation. Thus, if coefficient 7 increases, coefficients 8 decreases by substantially the same amount, and the combined entropy of coefficients 7 and 8 is not much greater than the entropy of coefficients 7 alone. Accordingly, due to correlations that may occur between the separate channel filter coefficients, the available entropy is typically less than the estimates of the coefficient samples provided in isolation.

For any practical implementation of a random number generator, the available physical entropy has to be estimated. This entropy estimation process may be performed by initially retrieving and hashing the bits of each channel filter coefficient dataset (e.g., 12×8=96 bits) to obtain a k bit output. Then, this number k may be decreased from the estimated Shannon Entropy that is attainable from the channel filter coefficient dataset (e.g., 32 bits, as shown in Table 1) until the concatenated output blocks pass all commonly-used randomness tests. The hashing operations desirably modify the statistical distributions of the signals to increase the level of randomness at the expense of reducing the number of output bits (i.e., the throughput or yield). Examples of suitable hashing operations include XOR trees, linear feedback shift registers, arithmetic hash functions, Secure Hash Algorithm (SHA) functions, Advanced Encryption Standard (AES) functions with discarding a few output bits, Data Encryption Standard (DES) functions also with discarding output bits, and combinations thereof.

The commonly-used randomness tests are typically sensitive to non-uniform distribution of k-bit blocks, but many other non-random properties are also typically checked as well. Thus, when the tests pass with a particular choice of k, it is believed that each possible k-bit block in the sequence of the hashed coefficient sets occurs at roughly the same number of times. In other words, each hashed filter coefficient set appears independently, at about the same frequency. Consequently, no filter coefficient set occurs with a probability that is substantially greater than $2^{-k}$, and the min-entropy of one coefficient set is about k. When n such independent blocks are used to seed the random number generator, an attacker has a search space of at least $2^{k \cdot n}$ elements when trying different seeds in a copy of the random number generator to guess the seed, which may be employed in the random number generator of the storage device 10 (e.g. n=k=16 gives about $2^{256}$ seeds to try).

Figure 4:
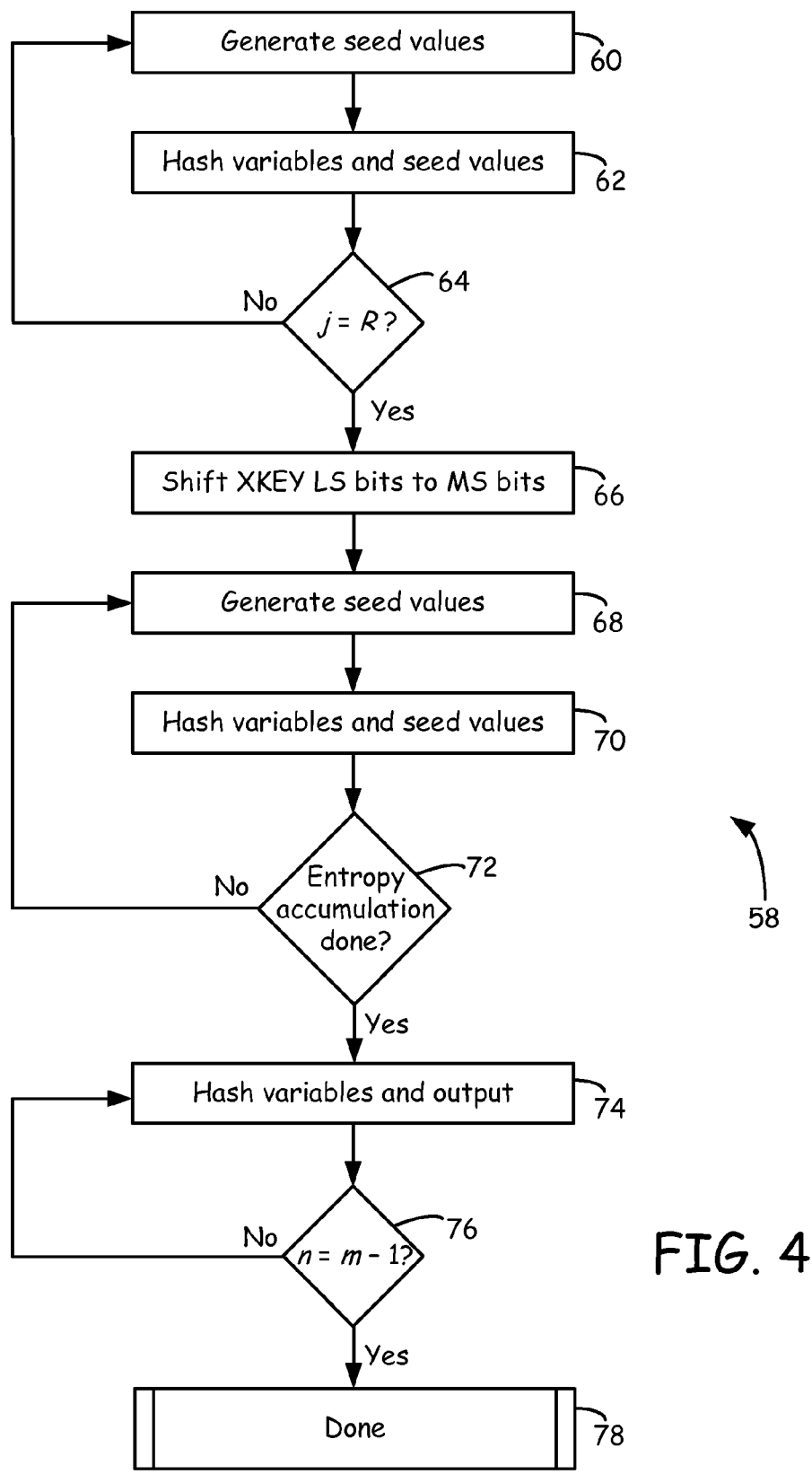
FIG. 4 is a flow diagram of a method for generating random numbers based on physical entropy attainable with the channel filter coefficients of the data storage device.

FIG. 4 is a flow diagram of method 58 for generating m random numbers based at least in part on the physical entropy attainable with channel filter coefficients of storage device 10. The following discussion of method 58 is made with reference to a cryptographic random number generator specified in the Federal Information Processing Standards (FIPS) Publication 186-2 with the SHA-1 hash function and a 192-bit internal state to provide random number outputs $x_j$, each having a 160-bit size. However, storage device 10 and method 58 are also suitable for use with a variety of different random number generation and hashing algorithms (e.g., FIPS-186-2 and SHA-256).

Prior to performing method 58, variables of the random number generator are desirably preset. For example, FIPS-186-2 requires initialization of variables such as an internal state seed key (referred to as XKEY) and t, where t=[H0||H1||H2||H3||H4] and is initialized to t=67452301 EFCDAB89 98BADCFE 10325476 C3D2E1F0 under the SHA-1 hash function. The initial entropy of XKEY is zero at boot up of storage device 10. However, XKEY may alternatively be initially set as a secret value ranging between zero and $2^{192}-1$ (inclusive). Additionally, a counter for the number of seeding iterations j may also be set to zero (i.e., j=0).

After the variables are preset, method 58 may be performed. As shown, method 58 includes steps 60-80, and initially involves generating seeds values from sources of physical entropy. This may involve retrieving one or more channel filter coefficients (e.g., with controller 50), as discussed above (step 60). Based on the above-discussed entropy estimation process, one channel filter coefficient dataset typically provides at least about 16 bits of entropy. Therefore, a sampling of eight datasets is suitable for providing 128-bits of physical entropy, desirable for generating 128-bit cryptographic keys. The retrieval of eight data sets may be performed in about 80 milliseconds, thereby allowing up to about twelve reseedings to be performed each second. In addition to the channel filter coefficients, controller 50 may also retrieve physical entropy from other sources in storage device 10, such as by sampling a free running counter of storage device 10. This improves security against hardware-based attacks that attempt to influence the channel filter coefficients.

The seed values for the random number generator (referred to XSEED$_j$) may then be generated from the retrieved channel filter coefficients (and from any additional physical entropy sources). In the current example, the four least-significant bits of 11 channel filter coefficients, per each of eight datasets, together with counter sampling, may provide about 384 raw seed bits. Because the random number generator in this example is limited to a 192-bit internal state, the 384 raw seed bits may be divided into two 192-bit XSEED$_j$ values for use in two separate iterations of the algorithm.

An updated XKEY (referred to as a seed-key) may then be generated from the initialized variables (e.g., XKEY, t, and j) and the XSEED$_j$ value (step 62). Under the FIPS-186-2 algorithm, the updated XKEY may be generated by the following algorithm:

$$XVAL=(XKEY+XSEED_j) \bmod 2^{192}$$

$$x_j=SHA1(t,XVAL).$$

$$XKEY=(1+XKEY+x_j) \bmod 2^{192}$$

As shown, the algorithm generates XVAL based on XKEY and XSEED$_j$, generates the random number $x_j$ based on the SHA-1 hashing function of t and XVAL, and updates XKEY based on the previous value of XKEY and the random number $x_j$. It is noted that at this point in the algorithm, the random number $x_j$ is desirably not output. As discussed below, the algorithm under method 58 desirably accumulates a suitable amount of physical entropy prior to outputting the random numbers $x_j$, while keeping XKEY continuously updated.

After step 62 of method 58, regardless of the entropy of XSEED$_j$, the entropy in XKEY cannot increase to more than 160 bits (i.e., the length of the added $x_j$), which is stored in the least-significant 160 bits of XKEY. Under a standard operation, during the next iterations only these least-significant 160 bits would be directly further modified, the most significant bits are only affected by the carry bit from manipulating the least significant bits. As a result, the accumulated entropy stored in XKEY would only increase slowly beyond 160 bits. However, as discussed below, steps 66 and 68 of method 58 are intended to compensate for this limitation.

In step 64 of method 58, controller 50 determines whether the current iteration is equal to a preset iteration value R, which is desirably preset to allow a suitable number of iterations under steps 60-64 to pass to accumulate physical entropy. Examples of suitable values for R range from two to about two less than the total number of entropy-accumulation iterations. In the current example, during the first iteration j=0. As such, j≠R and steps 60-66 may be repeated until j=R. This allows a suitable amount of physical entropy to be accumulated. Once j=R, then the values in the least-significant (LS) 160 bits of XKEY may be shifted up to fill the most-significant or more-significant (MS) bits of XKEY (step 66). This allows subsequent iterations to only affect the least-significant 160 bits of XKEY and keeps the initial entropy stored in the most/more-significant bits of XKEY intact.

Accordingly, the seeding process may be performed in two phases. The first phase (steps 60-64) starts with XKEY=0, and may use a portion of the total number of seeding iterations to accumulate the physical entropy from the channel filter coefficients. During this phase, the generated random numbers $x_j$ are discarded and only XKEY is kept updated. In the beginning of the second phase (i.e., step 66), the least-significant 160 bits of the current XKEY may be shifted to the most/more-significant bits of XKEY. The remaining iterations (steps 68-72) may then be used to accumulate the rest of the physical entropy for updating the least-significant 160 bits of the current XKEY. Accordingly, steps 68 and 70 may be performed in the same manner as discussed above for steps 60 and 62 for increasing the entropy in the least-significant 160 bits of XKEY.

When the entropy accumulation is completed (e.g., based on a preset number of iterations) (step 72), an updated XKEY may then be generated from the entropy-accumulated values, and $x_j$ may be outputted as needed (step 74). Under the FIPS-186-2 algorithm, XKEY may again be updated by the following algorithm:

$$x_j=SHA1(t,XVAL).$$

$$XKEY=(1+XKEY+x_j) \bmod 2^{192}$$

The outputted $x_j$ contains a high level of entropy due to the accumulated physical entropy attained with the algorithm of method 58. Generating secure random numbers in this manner precludes the need for secure, protected storage for keys or for the internal state of the generator.

At this point, the internal state may also be updated. Controller 50 may then determine whether the current iteration is the last iteration (i.e., whether n=m−1) (step 76). If not, then steps 74 and 76 may be repeated to continue to hash and output additional $x_j$ values and update XKEYS until the last iteration is reached. At this point, the initialization of the random number generation process may be terminated (step 78). This above-discussed process of method 58 uses multiple, successive samplings of the channel filter coefficient datasets for initialization of the cryptographic pseudorandom number generator. Later, multiple random numbers may be generated to be used for a variety of purposes (e.g., cryptographic purposes) and/or may be combined through one or more additional hashing operations for subsequent use.

In an alternative embodiment, when accumulating more than 320 bits of internal entropy (i.e., when XKEY is chosen longer than 40 bytes), step 66 may be expanded to additional bit locations in XKEY. This allows subsequent iterations to only affect the least-significant 160 bits of XKEY, and keeps the entropies stored in the successive-significant bits of XKEY intact. The SHA-1 hash function limits the number of usable bits to 512 bits. However, in alternative embodiments, the SHA-1 hash function may be replaced by hash functions operating on larger (or on multiple) blocks.

It is noted that the format and content of the seeding data is not specified in the FIPS-186-2 publication. As such, in one embodiment of method 58, each channel filter coefficient may undergo one or more pre-processing operations prior to generating the XSEED in steps 60 and 68. For example, each channel filter coefficient dataset may be compressed (e.g., to 40 bits), while desirably retaining at least the four least-significant bits of each coefficient to preserve the physical entropy. Several of these compressed blocks may then be used concatenated in steps 62 and 70 of method 58, thereby speeding up the seeding process by trading the slower SHA-1 hash function calls with faster data compression steps.

Although the present disclosure has been described with reference to preferred embodiments, workers skilled in the art will recognize that changes may be made in form and detail without departing from the spirit and scope of the disclosure.

The invention claimed is:

1. A device comprising:
  a plurality of registers configured to store channel filter coefficients, each of the channel filter coefficients including a plurality of bits;
  a controller configured to:
    retrieve at least one of the channel filter coefficients from the plurality of registers;
    generate at least one seed value based at least in part on the retrieved at least one channel filter coefficients;
    perform a hashing algorithm on the at least one seed value; and
    generate a random number based at least in part on the at least one hashed seed value.

2. The device of claim 1, further comprising the controller configured to generate the random number based at least in part on the two least-significant bits of the at least one retrieved channel filter coefficients.

3. The device of claim 2, further comprising the controller configured to generate the random number based at least in part on each bit of the at least one retrieved channel filter coefficients.

4. The device of claim 1, wherein the at least one retrieved channel filter coefficient provides at least about 1.5 bits of Shannon Entropy to the generated random number.

5. The device of claim 4, wherein the at least one retrieved channel filter coefficient provides at least about 3.0 bits of Shannon Entropy to the generated random number.

6. The device of claim 1, wherein the at least one retrieved channel filter coefficient comprises each of the channel filter coefficients.

7. A device comprising:
  a controller configured to retrieve channel filter coefficients from a plurality of registers of a data receiver, each of the retrieved channel filter coefficients comprising a plurality of bits; and
  a random number generator configured to generate a random number seeded at least in part by a number of least-significant bits less than the plurality of bits of the retrieved channel filter coefficients.

8. The device of claim 7, further comprising the random number generator is configured to generate the random number seeded at least in part by the two least-significant bits of the retrieved channel filter coefficients.

9. The device of claim 7, further comprising the random number generator is configured to generate the random number seeded at least in part by the four least-significant bits the retrieved channel filter coefficients.

10. The device of claim 7, comprising the controller further configured to:
  perform a seek and read operation in response to a request for a random number.

11. The device of claim 10, further comprising:
  a data storage medium;
  the plurality of registers;
  a transducing head to perform the read and seek operation on the data storage medium and produce a read signal;
  an equalization filter configured to:
    receive the read signal from the transducing head;
    modify the read signal based on the channel filter coefficients to produce an equalized read signal;
  a signal detector to receive the equalized read signal and output a correction signal when the equalized read signal is below a specified quality level;
  the controller further configured to:
    direct the equalization filter to update the channel filter coefficients based on the correction signal; and
    retrieve the channel filter coefficients and generate the random number seeded at least in part by a number of least-significant bits less than the plurality of bits of the retrieved channel filter coefficients.

12. The device of claim 7, further comprising the random number generator configured to accumulate entropy from at least a portion of the retrieved channel filter coefficients prior to generating the random number.

13. The device of claim 7, further comprising the random number generator configured to perform a hashing operation on the retrieved channel filter coefficients.

14. A method comprising:
  retrieving channel filter coefficients from a plurality of registers, each of the channel filter coefficients comprising a plurality of bits;
  generating at least one seed value based at least in part on the retrieved channel filter coefficients;
  performing a hashing algorithm on the at least one seed value; and
  generating a random number based at least in part on the at least one hashed seed value.

15. The method of claim 14, wherein the seed value is generated based at least in part on a number of least-significant bits less than all of the bits of the retrieved channel filter coefficients.

16. The method of claim 14, and further comprising updating the channel filter coefficients in the plurality of registers in response to a request for a random number, and retrieving the channel filter coefficients from the plurality of registers comprises retrieving the channel filter coefficients after the update.

17. The method of claim 14, wherein retrieving the channel filter coefficients, generating at least one seed value, and performing the hashing algorithm are performed over a plurality of iterations prior to outputting the random number, wherein the random number is based at least in part on the at least one hashed seed value from each of the iterations.

18. The method of claim 17, and further comprising comparing a current iteration number to a preset iteration value that dictates when to output the random number.

* * * * *